Sept. 20, 1932.    M. J. GRAHAM    1,878,493
GAUGE STRUCTURE
Filed July 9, 1928
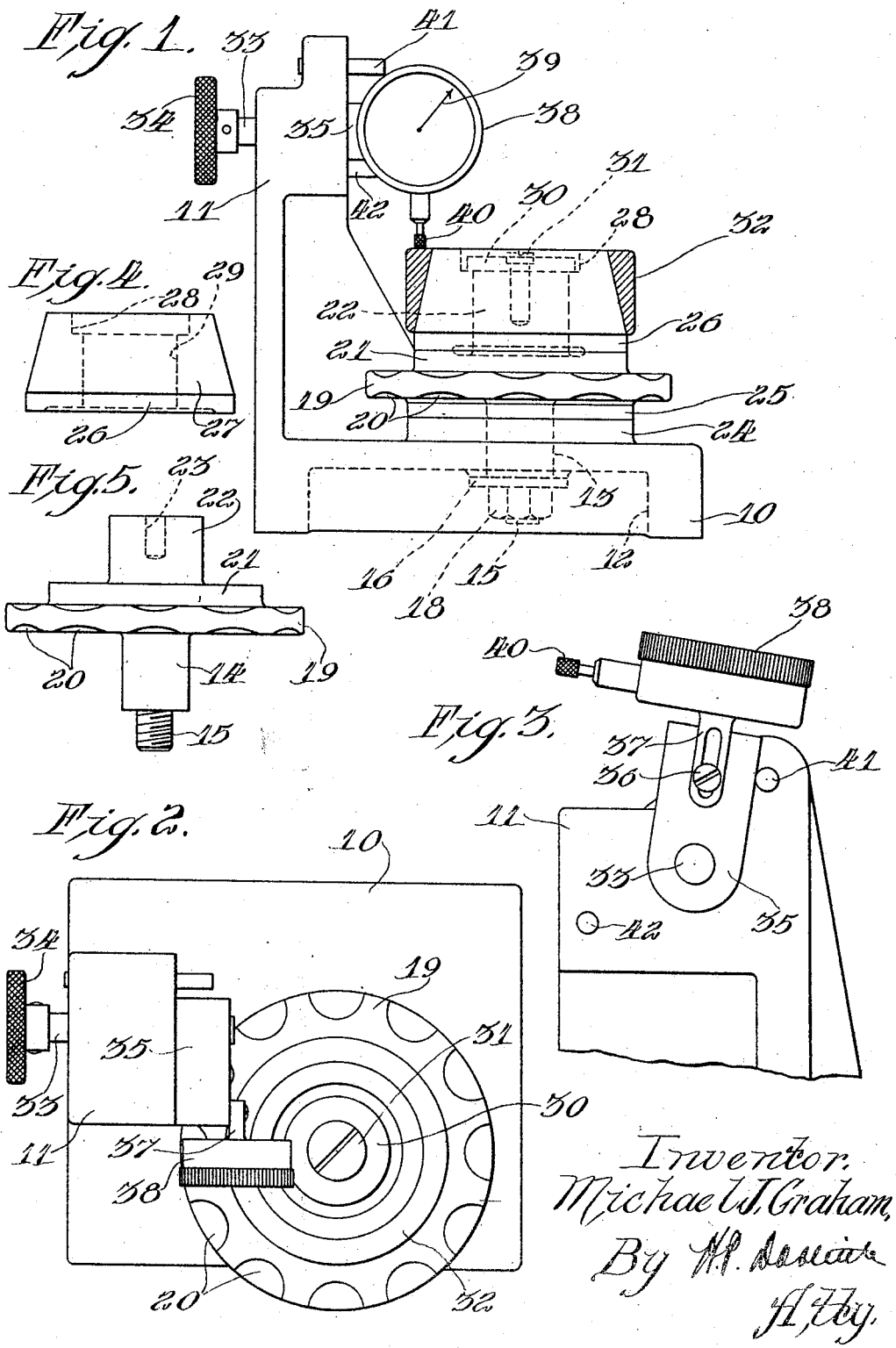

Patented Sept. 20, 1932

1,878,493

UNITED STATES PATENT OFFICE

MICHAEL J. GRAHAM, OF CHICAGO, ILLINOIS, ASSIGNOR TO INTERNATIONAL HARVESTER COMPANY, A CORPORATION OF NEW JERSEY

GAUGE STRUCTURE

Application filed July 9, 1928. Serial No. 291,450.

The invention relates to a gauge structure for measuring the inside diameter, and the parallelism of the edges of finished tapered or straight roller bearing cups.

In the manufacture of roller bearings, and especially tapered roller bearings, it is necessary, when the tapered cup or cone has been finished and is ready for assembly in a finished bearing, that this cup or cone be gauged for its accuracy, so that this element of the bearing will properly assemble and operate as perfectly as possible when the finished bearing is in use, so that friction will be reduced to a minimum.

The objects of the invention are to provide an improved gauge structure for gauging the parallelism of the opposite ends of the cup or cone for a roller bearing; to gauge the inside diameter of such elements; to provide a gauge which will simultaneously perform the above two mentioned operations so as to simplify the gauging operation; and, lastly, generally to provide an improved and simple gauge structure for the purposes specified.

Briefly, these desirable objects are achieved in a gauge structure which, in the illustrative embodiment herein disclosed, includes a base and an upright frame, the base carrying in a particular manner to be described a rotatable work holder, which includes means for permitting turning of the holder by hand. The upright frame carries in a particular manner a gauge which can be adjusted relative to the work and which also is so mounted that it may be moved to work engaging position or to a position tilted back away from the work, there being stops in both of these positions to hold the gauge in its place.

In the sheet of drawing accompanying this application,—

Figure 1 is a general side elevational view with the work on the holder shown in section;

Figure 2 is a top plan view;

Figure 3 is an end view of the gauge mounting with the gauge tilted back away from the work;

Figure 4 is a detail view of the work holder per se; and

Figure 5 is a detail view of the means for mounting the work holder and for turning it.

The gauge structure of this invention embodies a base 10, an upright frame 11, the base being hollowed out on its under side, as indicated at 12, said base being provided with a vertical opening 13 adapted to receive the mounting element shown in Figure 5, which comprises a lower stud part 14 fitted into the opening 13, the lower end of the stud 14 having a reduced, threaded extension 15 designed to receive a conventional ring washer 16 and a nut 18 for turnably securing the structure of Figure 5 to the base. This mounting part includes an annular flange 19 provided with a series of finger hold pockets 20 along its peripheral edge, and above this hand operating annulus is a rest 21, which has above it an upright stud 22 provided with a hole 23.

It will be understood that the sleeve 14 of the mounting member shown in Figure 5 is dropped down through the hole 13 and turnably held in place by the ring 16 and the nut 18, there being mounted between the base 10 and the annulus 19 a spacer block 24 and a loose thrust ring 25 for the annulus to bear on.

The work holder is shown in Figure 4, and it comprises a flange 26 which rests on the rest 21, the flange 26 having formed therewith and thereabove a tapered plug part 27, said plug at its top having an opening 28 of shallow depth, which merges into a bore 29 adapted to fit over the stud 22 of the mounting part heretofore described. A lock plate 30 fits into the opening 28 with a screw 31 passing through said plate and into the opening 23 in the stud 22, thereby locking the work holder to the mounting and operating member shown in Figure 5. A cone representing a piece of work is shown at 32, and this is fitted over the plug 27 in a position ready to be gauged by means of a gauge, which will now be described.

The upper end of the frame upright 11 is provided with a shaft 33 carrying a fast thumb screw 34 at one end, and, at its other end, an arm 35 which arm moves with the shaft 33, as it is fast thereon. This arm 35 carries a set screw 36 and, slidable over this screw, is a slotted bracket 37 formed on the body of a gauge 38, which in this illustration may be an indicator gauge having an indicator needle 39 and a needle operating means in the form of a plunger 40 contactable with the work, as shown in Figure 1, to operate the needle 39 to give an indication. The screw 36 and slotted bracket 37 enable the gauge to be given an adjusted set position with respect to the arm 35 and relative to the work on the work holder plug 27, as will be understood.

At two spaced points the upper end of the upright 11 carries stop pins 41 and 42. When the work is in position to be gauged as shown in Figure 1, the arm 35 rests against the pin 42 to hold the gauge in that position, and when placing work on the work holder, to provide clear entry for the work, the operator turns the knob 34 to rock the shaft 33 to tilt the arm 35 and with it the gauge, upwardly and back to the position shown in Figure 3, where the stop 41 functions to hold the gauge in its tilted back, raised position.

In use, the gauge structure is assembled as has been indicated and the operator places a piece of work 32, such for example as the conical or tapered cup of a tapered roller bearing, onto the work holding plug 27. Then the gauge plunger 40 is made to engage the upper edge of the cone. The operator then by hand turns the flange 19 and this, of course, rotates the plug, as the part 14 is loose in the opening 13 in the base. As the work rotates, any inaccuracy in its dimensions as to height will be communicated to the plunger 40 to make the needle 39 indicate such irregularity. Thus, the upper and lower edges can be gauged for parallelism. Of course, it will be understood that the plug 27 is a master plug and is perfect and thus, if the inner taper of the work 32 does not properly fit the cone plug, then the operator also knows that the inner taper or inner diameter of the work is also inaccurate and, of course, such inaccuracy would also be communicated to the gauge indicator.

From this disclosure it can now be appreciated that a gauge structure has been provided which meets all of the desirable objects heretofore described.

It is the intention to cover all such changes and modifications of the form herein shown which do not materially depart from the spirit and scope of the invention as is indicated in the appended claims.

What is claimed as new is:

1. In a gauge, a base formed with an opening and a standard, an integral fixture comprising a horizontal rest with a vertical stud extending thereabove and another vertical stud extending therebelow, the lower stud fitting loosely in the base opening turnably to mount the fixture on the base, a masterpiece resting on the rest, means securing said masterpiece to the upper stud, said masterpiece being adapted to carry a complementary piece of work to be gauged, an arm pivotally connected to the standard, and a gauge having a work engaging element carried by said arm.

2. In a gauge, a base formed with an opening and a standard, an integral fixture comprising a horizontal rest with a vertical stud extending thereabove and another vertical stud extending therebelow, the lower stud fitting loosely in the base opening turnably to mount the fixture on the base, a masterpiece resting on the rest, means securing said masterpiece to the upper stud, said masterpiece being adapted to carry a complementary piece of work to be gauged, an arm pivotally connected to the standard, a gauge having a work engaging element carried by said arm and adjustable thereon toward or away from the pivot of the arm, and means for securing the gauge in any selected position on the arm.

3. In a gauge, a base formed with an opening and a standard, an integral fixture comprising a horizontal rest with a vertical stud extending thereabove and another vertical stud extending therebelow, the lower stud fitting loosely in the base opening turnably to mount the fixture on the base, a masterpiece resting on the rest, means securing said masterpiece to the upper stud, said masterpiece being adapted to carry a complementary piece of work to be gauged, an arm pivotally connected to the standard, a gauge having a work engaging element carried by said arm and adjustable thereon toward or away from the pivot of the arm, and stops on the standard to limit upward and downward pivotal movement of the arm.

In testimony whereof I affix my signature.

MICHAEL J. GRAHAM.